US010817220B2

(12) United States Patent
Bono et al.

(10) Patent No.: US 10,817,220 B2
(45) Date of Patent: Oct. 27, 2020

(54) SHARING PROCESSOR CORES IN A MULTI-THREADING BLOCK I/O REQUEST PROCESSING DATA STORAGE SYSTEM

(71) Applicant: EMC IP Holding Company LLC, Hopkinton, MA (US)

(72) Inventors: Jean-Pierre Bono, Westborough, MA (US); Sudhir Srinivasan, Acton, MA (US); Joon-Jack Yap, Southborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 23 days.

(21) Appl. No.: 16/263,263

(22) Filed: Jan. 31, 2019

(65) Prior Publication Data

US 2020/0249867 A1 Aug. 6, 2020

(51) Int. Cl.
*G06F 3/06* (2006.01)
*G06F 9/48* (2006.01)

(52) U.S. Cl.
CPC ............ *G06F 3/0659* (2013.01); *G06F 3/061* (2013.01); *G06F 3/067* (2013.01); *G06F 9/4887* (2013.01)

(58) Field of Classification Search
CPC .................................................... G06F 9/4887
See application file for complete search history.

(56) References Cited

U.S. PATENT DOCUMENTS

| 6,810,462 | B2 | 10/2004 | Matsunami et al. |
| 6,850,955 | B2 | 2/2005 | Sonoda et al. |
| 7,003,687 | B2 | 2/2006 | Matsunami et al. |
| 7,231,491 | B2 | 6/2007 | Matsunami et al. |
| 7,240,154 | B2 | 7/2007 | Frangioso et al. |
| 7,424,491 | B2 | 9/2008 | Sonoda et al. |
| 7,444,468 | B2 | 10/2008 | Matsunami et al. |
| 8,463,989 | B2 | 6/2013 | Kumagai |
| 8,984,235 | B2 | 3/2015 | Kudo et al. |
| 9,268,702 | B2 | 2/2016 | Bilas et al. |
| 9,354,926 | B2 * | 5/2016 | King-Smith .......... G06F 9/4843 |

(Continued)

OTHER PUBLICATIONS

Ishkov, Nikita, "A complete guide to Linux process scheduling," University of Tampere, School of Informational Sciences, Computer Science, M.Sc: Thesis, Feb. 2015, 62 pages.

(Continued)

*Primary Examiner* — Tammara R Peyton
(74) *Attorney, Agent, or Firm* — BainwoodHuang

(57) ABSTRACT

A block I/O request processing threads executes only on a processor core to which it is assigned. After it executes for a period of time, the block I/O request processing thread yields its assigned processing core to another type of thread that is runnable on the processing core, such as a file I/O request processing thread. When there are no block I/O requests for a block I/O request processing thread to process, it is suspended from being executed. A monitor thread running on another processing core detects that a newly received block I/O request is available for processing, and makes the block I/O request processing thread runnable again. The block I/O request processing thread may be assigned a higher priority than file I/O request processing threads, and preempt any runnable file I/O request processing threads when it is made runnable to process the newly received block I/O request.

13 Claims, 8 Drawing Sheets

(56) References Cited

U.S. PATENT DOCUMENTS

| | | | | |
|---|---|---|---|---|
| 9,703,594 B1* | 7/2017 | Kamboj | ............... | G06F 11/3409 |
| 10,261,799 B2* | 4/2019 | Ingram | ................ | G06F 9/4881 |
| 2014/0317629 A1* | 10/2014 | Stanfill | ................ | G06F 9/4494 |
| | | | | 718/102 |
| 2015/0277923 A1* | 10/2015 | Bradbury | ............ | G06F 9/30076 |
| | | | | 712/215 |

OTHER PUBLICATIONS

Kumar, Avinesh, "Multiprocessing with the Completely Fair Scheduler," IBM, Jun. 5, 2009, <<http://homepage.smc.edu/morgan_david/cs40/multimedia/cfs_scheduler_ibm1.pdf>> accessed Feb. 28, 2019, 11 pages.

Lamourine, Mark, "Storage Options for Software Containers," File Systems and Storage, www.usenix.org, ;login: Feb. 2015, vol. 40, No. 1, 14 pages.

* cited by examiner

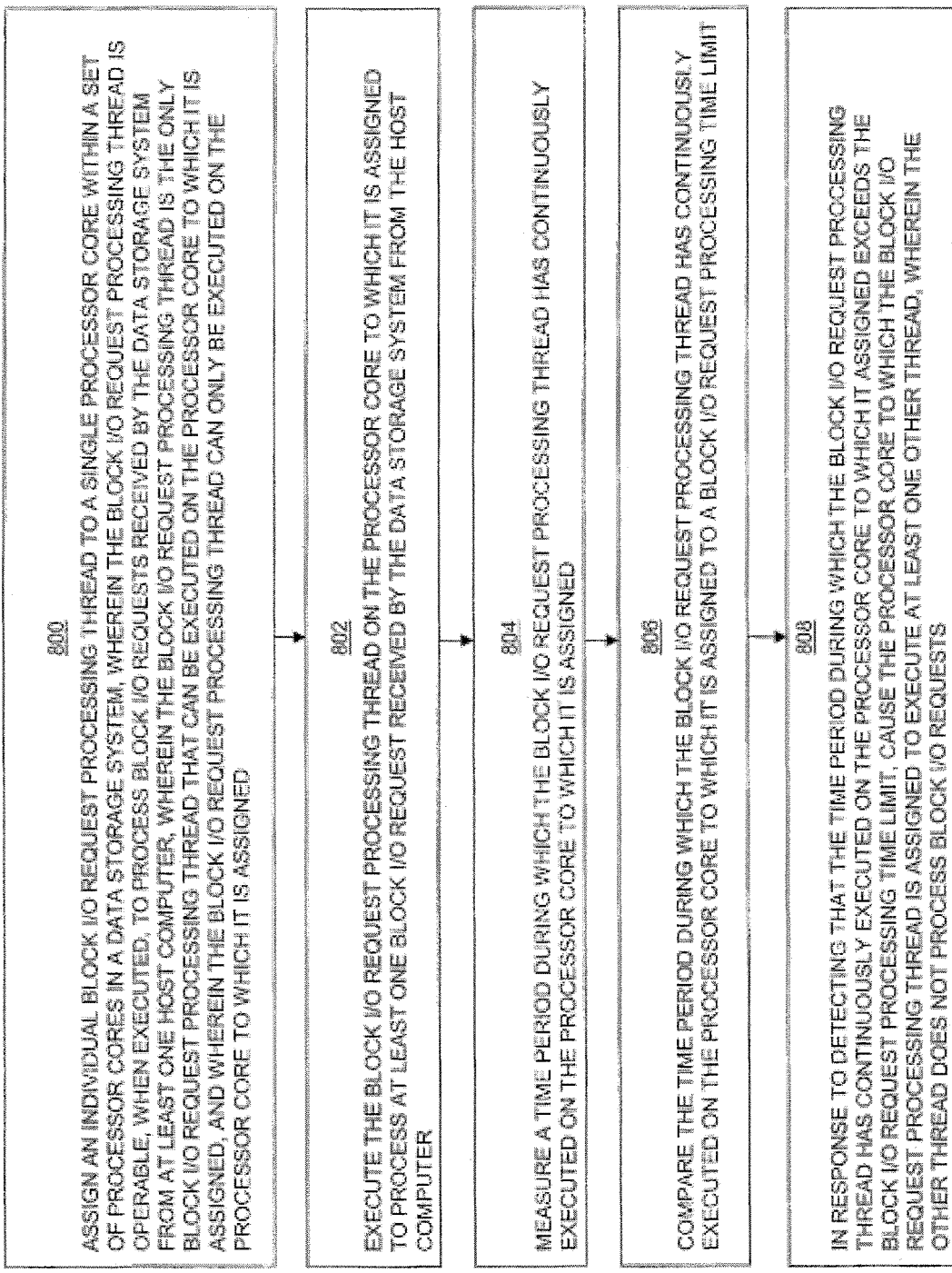

SHARING PROCESSOR CORES IN A MULTI-THREADING BLOCK I/O REQUEST PROCESSING DATA STORAGE SYSTEM

TECHNICAL FIELD

The present disclosure relates generally to intelligent data storage systems, and more specifically to technology for sharing processor cores in a data storage system.

BACKGROUND

Data storage systems are arrangements of hardware and software that include non-volatile data storage devices (e.g. electronic flash drives, magnetic disk drives, and/or optical drives) that are used to provide non-volatile storage for processing host I/O requests (i.e. write requests and read requests) received from one or more host computers. The host I/O requests that are processed by a data storage system may include block I/O requests as well as file I/O requests.

Block I/O requests are directed to logical disks (e.g. logical units sometimes referred to as LUNs), and/or block-based virtual volumes (VVols), that are hosted by the data storage system. The data storage system maps the logical disks and/or virtual volumes that it hosts to units of non-volatile storage contained within its data storage devices, and uses those units of non-volatile storage to persistently store host data it receives from host computers that is directed to those logical disks and/or virtual volumes. Block I/O requests are communicated from host computers to the data storage system using block storage interfaces and protocols such as, for example, the Small Computer System Interface (SCSI), Fibre Channel (FC), Serial Attached SCSI (SAS), Internet Small Computer System Interface (iSCSI), and/or other block storage interfaces and protocols.

File I/O requests are directed to files in file systems that are hosted by the data storage system. The data storage system maps files in file systems that it hosts to units of non-volatile storage contained within its data storage devices, and uses those units of non-volatile storage to persistently store host data it receives from host computers that is directed to those files. File I/O requests are communicated from host computers to the data storage system using file storage interfaces and protocols such as, for example, the Network File System (NFS) distributed file system protocol, the Server Message Block (SMB)/Common Internet File System (CIFS) application-layer network protocol, Apple Filing Protocol (AFP), and/or other file storage interfaces and protocols.

SUMMARY

Previous data storage system technology has exhibited some shortcomings with regard to its ability to effectively share processing resources between program code that processes block I/O requests and other program code. For example, in some previous technologies, program code that processes block I/O requests was implemented using an asynchronous programming approach, in which a single block I/O request processing thread was generated for each individual processor core, and then continuously executed on that processor core in a busy loop in order to process multiple block I/O requests as they were received by the data storage system. A separate context was stored outside of the block I/O request processing thread for the block I/O requests being processed. In some circumstances, executing such a busy-loop thread on each processor core to process block I/O requests may provide low latency with regard to processing block I/O requests. However, even when no block I/O requests needed to be processed, the busy loop block I/O request processing thread in previous systems continued to be executed on the processing core to which it was assigned. In some operational contexts in which the data storage system only needs to process block I/O requests, and in which the processor core need not be shared with threads that perform other types of processing, these previous approaches have been effective. However, in many operational contexts, it would be desirable for processor cores to be fairly shared between threads that perform block I/O request processing and other threads that perform other types of processing, e.g. threads that perform file I/O request processing. In those contexts, the busy-loop threads used in some previous systems to process block I/O requests would unfairly dominate the utilization of the processor cores to which they are assigned, resulting in poor data storage system performance in terms of host I/O request processing latency, and/or I/O operations per second (IOPS).

Some previous data storage systems have attempted to address this unfairness by segregating processor cores between different types of host I/O request processing, e.g. reserving one subset of processor cores to execute only block I/O request processing threads, and reserving another subset of processor cores to execute only other types of threads, e.g. only file I/O request processing threads. The inflexibility of such segregation based solutions makes them unable to provide efficient processing resource utilization for the various different workload mixes that a data storage system may encounter, in which the ratio of processing resources needed to process received block I/O requests versus the processing resources needed to process to received file I/O requests may vary widely.

In order to address the above described and other shortcomings of previous technologies, new technology is disclosed herein for sharing a set of processor cores in a data storage system. In the disclosed technology, an individual block I/O request processing thread is assigned to a single processor core within a set of processor cores in the data storage system. The block I/O request processing thread is operable, when executed, to process block I/O requests received by the data storage system from at least one host computer. The block I/O request processing thread assigned to a processor core is the only block I/O request processing thread that can be executed on that processor core, and can only be executed on that processor. The block I/O request processing thread is then executed on the processor core to which it is assigned to process at least one block I/O request received by the data storage system from a host computer. The time period during which the block I/O request processing thread continuously executes on the processor core to which it is assigned is measured. The time period during which the block I/O request processing thread has continuously executed on the processor core to which it is assigned is compared to a block I/O request processing time limit. In response to detecting that the time period during which the block I/O request processing thread has continuously executed exceeds the block I/O request processing time limit, the processor core to which the block I/O request processing thread is assigned is caused to execute at least one other thread. The other thread that is caused to execute on the processor core assigned to the block I/O request processing thread performs processing that does not include processing block I/O requests.

In another aspect of the disclosed technology, the other thread that is caused to execute on the corresponding processor core to which the block I/O request processing thread is assigned may consist of or include at least one file I/O request processing thread that is currently runnable on that processor core. The file I/O request processing thread is operable, when executed, to process a file I/O request corresponding to the file I/O request processing thread. Executing the file I/O request processing thread on the processor core to which the block I/O request processing request is assigned may cause the file I/O request processing thread to complete processing of the single file I/O request corresponding to the file I/O request processing thread.

In another aspect of the disclosed technology, the disclosed technology may detect that no block I/O requests are available for processing by the block I/O request processing thread. In response to detecting that no block I/O requests are available for processing by the block I/O request processing thread, the disclosed technology may suspend execution of the block I/O request processing thread. Suspending execution of the block I/O request processing thread prevents the block I/O request processing thread from executing on the processor core to which the block I/O request processing thread is assigned until the block I/O request processing thread is subsequently made runnable again.

In another aspect of the disclosed technology, subsequent to suspending execution of the block I/O request processing thread, the disclosed technology may detect that a newly received block I/O request is available for processing by the block I/O request processing thread. In response to detecting that a newly received block I/O request is available for processing by the block I/O request processing thread, the disclosed technology makes the block I/O request processing thread runnable. Making the block I/O request processing thread runnable causes the block I/O request processing thread to execute on the processor core to which the block I/O request processing thread is assigned, in order to process the newly received block I/O request.

In another aspect of the disclosed technology, a monitor thread may be assigned to a second processor core within the set of processor cores in the data storage system. The second processor core within the set of processor cores is different from the processor core to which the I/O request processing thread is assigned, and the monitor thread can only execute on the second processor core. The monitor thread is operable, when executed, subsequent to the execution of the block I/O request processing thread being suspended, to i) detect that the newly received block I/O request is available for processing by the block I/O request processing thread, and ii) in response to detecting that the newly received block I/O request is available for processing by the block I/O request processing thread, make the block I/O request processing thread runnable.

In another aspect of the disclosed technology, a first priority may be assigned to the block I/O request processing thread, and a second priority may be assigned to each file I/O request processing thread. The second priority is relatively lower than the first priority. Making the block I/O request processing thread runnable after execution of the block I/O request processing thread was suspended causes the block I/O request processing thread to preempt execution of at least one runnable file I/O request processing thread and to immediately begin execution on the processor core to which it is assigned, in response to the first priority assigned to the block I/O processing thread being relatively higher than the second priority assigned to each file I/O request processing thread.

Embodiments of the disclosed technology may provide significant advantages over previous technologies. For example, by causing the block I/O request processing thread to share the processor core to which it is assigned with other types of threads, e.g. after the block I/O request processing thread has executed for a limited period of time, and/or when the block I/O request processing thread has no received block I/O requests to process, embodiments of the disclosed technology may improve performance over previous technologies in which a single block I/O request processing thread generated for each individual processor core continuously executed on that processor core in a busy loop. In particular, embodiments of the disclosed technology may provide improved fairness with regard to sharing of the processing resources of the data storage system across threads used to process different types of host I/O requests, and potentially other types of threads. In addition, in operational conditions in which block I/O requests are the only type of requests that need to be processed, the disclosed technology is operable to provide low latency with regard to processing those block I/O requests. Further, the disclosed technology provides improved flexibility over previous technologies that segregated processor cores between different types of host I/O request processing threads, by enabling the data storage system to efficiently utilize processor resources under various different workload mixes of I/O requests that the data storage system may encounter when it is deployed.

BRIEF DESCRIPTION OF THE DRAWINGS

The foregoing and other objects, features and advantages will be apparent from the following description of particular embodiments of the disclosed technology, as illustrated in the accompanying drawings in which like reference characters refer to the same parts throughout the different views. The drawings are not necessarily to scale, emphasis instead being placed upon illustrating the principles of various embodiments of the disclosed technology.

FIG. 8 is a second flow chart showing an example of steps performed during operation of some embodiments to share processor cores in a data storage system.

DETAILED DESCRIPTION

Embodiments of the invention will now be described. The embodiments described herein are only examples of how features and principles of the invention may be embodied. The invention itself is accordingly broader than the examples described below.

The technology described herein for sharing processor cores across threads in a data storage system includes at least one block I/O request processing thread that executes only on a processor core to which it is assigned, and is the only block I/O request processing thread that executes on that processor core. After it executes for a period of time, the disclosed block I/O request processing thread yields its assigned processing core to another type of thread, such as a file I/O request processing thread. The disclosed block I/O request processing thread may be suspended from execution (e.g. suspends itself) when it detects that there is no work for it to perform, i.e. when there are no block I/O requests for the block I/O request processing thread to process. A monitor thread is also disclosed that may run on another processing core, and that may operate to make the block I/O request processing thread runnable again when it detects that a new block I/O request is available for processing by the block I/O request processing thread. In some embodiments the block I/O request processing thread may be assigned a higher priority than file I/O request processing threads, and accordingly will preempt the execution of any runnable file I/O request processing threads scheduled for execution when it is made runnable again to process the newly received block I/O request.

Figure 1:
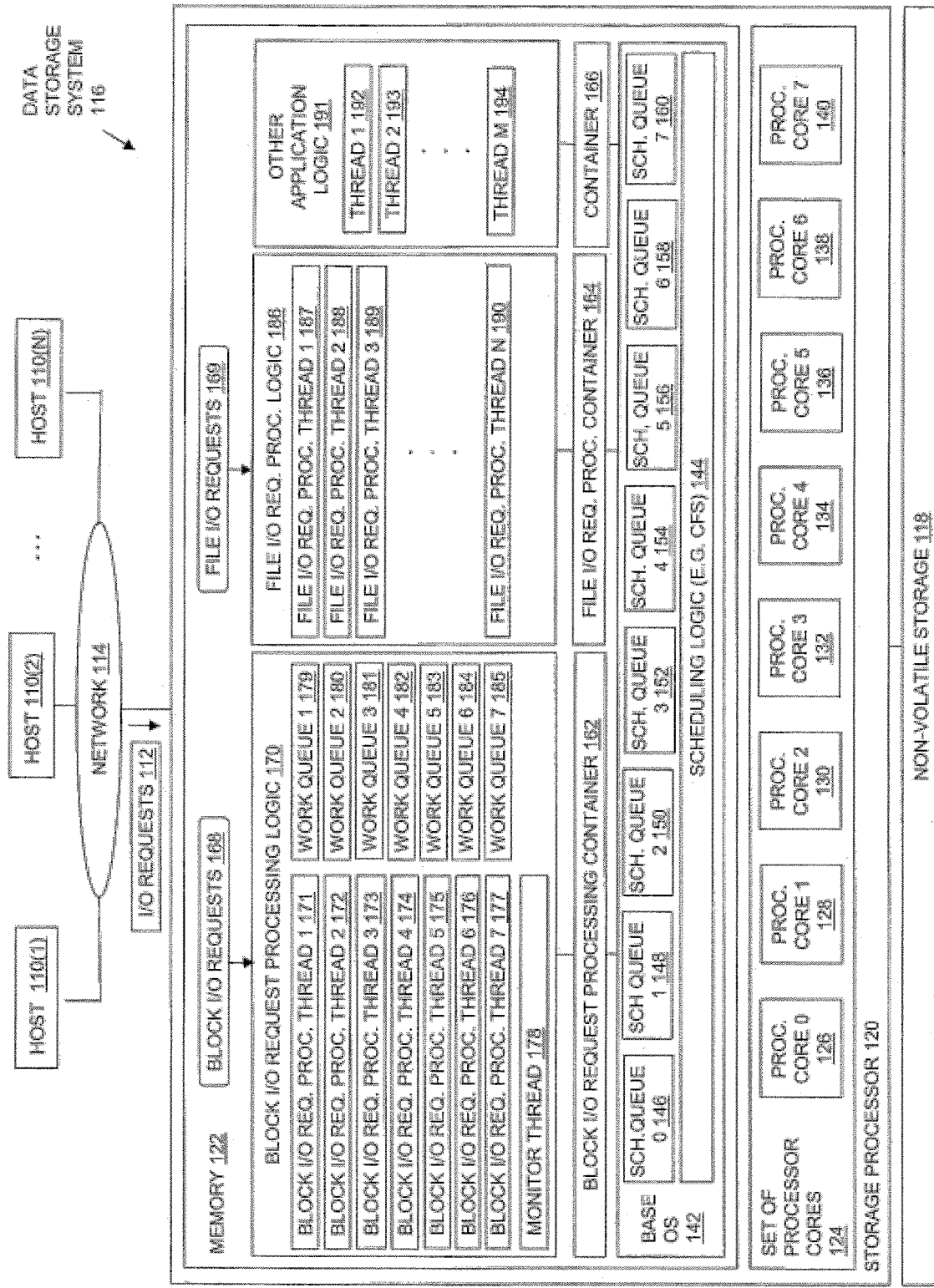
FIG. 1 is a block diagram showing an example of components in an operational environment including an embodiment of the disclosed technology.

FIG. 1 shows an example of an operational environment in which embodiments of the technology disclosed herein may operate, and an illustrative embodiment of the disclosed technology. As shown in FIG. 1, one or more host computers ("Hosts"), shown as host computers 110(1) through 110(N), and/or host applications executing in whole or in part on host computers 110(1) through 110(N), access non-volatile storage provided by a Data Storage System 116 over a Network 114. The Data Storage System 116 includes a Storage Processor 120 and Non-Volatile Storage 118. Data Storage System 116 may include multiple storage processors like Storage Processor 120. In some embodiments, multiple storage processors may be provided as circuit board assemblies, or "blades," which plug into a chassis that encloses and cools the storage processor. The chassis may have a backplane for interconnecting the storage processor, and additional connections may be made among storage processors using cables. Those skilled in the art will recognize, however, that no particular configuration of storage processors is required, as any number of storage processors, including a single storage processor, may be provided and that Storage Processor 120 may be any type of computing device capable of processing received host I/O requests.

Non-Volatile Storage 118 may include or consist of some number of disk drives. The disk drives in Non-Volatile Storage 118 may include magnetic disk drives, electronic flash drives, optical drives, and/or other types of non-volatile data storage drives or devices. In some embodiments, Non-Volatile Storage 118 may, for example, be organized into RAID groups, where each RAID group is composed of multiple disk drives in Non-Volatile Storage 118.

Network 114 may include or consist of any type of network or combination of networks, such as, for example, a storage area network (SAN), a local area network (LAN), a wide area network (WAN), the Internet, and/or some other type of network or combination of networks.

Hosts 110(1-N) and/or host applications executing in whole or in part on Hosts 110(1-N) may logically connect to and communicate with the Storage Processor 120 using various technologies. For example, I/O Requests 112 conveyed from Hosts 110(1-N) to Storage Processor 120 may include block I/O requests communicated from Hosts 110(1-N) to Storage Processor 120 using block storage interfaces and protocols such as, for example, the Small Computer System Interface (SCSI), Fibre Channel (FC), Serial Attached SCSI (SAS), Internet Small Computer System Interface (iSCSI), and/or other block storage interfaces and/or protocols. I/O Requests 112 conveyed from Hosts 110(1-N) to Storage Processor 120 may further include file I/O requests communicated from Hosts 110(1-N) to the Storage Processor 120 using file storage interfaces and protocols such as, for example, the Network File System (NFS) distributed file system protocol, the Server Message Block (SMB)/Common Internet File System (CIFS) application-layer network protocol, Apple Filing Protocol (AFP), and/or other file storage interfaces and/or protocols. Storage Processor 120 is accordingly configured to receive I/O requests through both block-based and file-based protocols, and to respond to I/O requests of either type by reading or writing the Non-Volatile Storage 118.

Storage Processor 120 may include one or more communication interfaces (not shown), a set of Processor Cores 124, and Memory 122. The communication interfaces of Storage Processor 120 may include, for example, SCSI target adapters and/or network interface adapters that convert electronic and/or optical signals received over Network 114 into electronic form for use by Storage Processor 120.

A Set of Processor Cores 124 contains multiple independent processing units, including Processor Core 0 126, Processor Core 1 128, Processor Core 2 130, Processor Core 3 132, Processor Core 4, 134, Processor Core 5 136, Processor Core 6 138, and Processor Core 7 140. Each one of the processor cores in the Set of Processor Cores 124 is capable of independently reading and executing threads of program instructions as they are scheduled for execution on that processor core. Some or all of the processor cores in the Set of Processor Cores 124 may be integrated into a single central processing unit chip or chip package. The Set of Processor Cores 124 may be a subset of the total number of processor cores contained in Storage Processor 120, or may be the complete set of processor cores contained in Storage Processor 120. While for purposes of explanation the Set of Processor Cores 124 in FIG. 1 is shown including eight processor cores, the disclosed technology is not limited to configurations that use a specific number of processor cores. Accordingly, the disclosed technology may alternatively be embodied with various other specific numbers of processor cores in the Set of Processor Cores 124.

Memory 122 may include both volatile memory (e.g., RAM), and non-volatile memory, such as one or more ROMs, disk drives, solid state drives, and the like. Processor Cores 124 and Memory 122 together may form specialized control circuitry, which is constructed and arranged to carry out specific methods and functions as described herein. Memory 122 is also shown including a variety of specialized software constructs that may be provided in the form of executable program instructions. When the executable instructions of the software constructs shown in FIG. 1 are executed by Processor Cores 124, Processor Cores 124 are caused to carry out the operations of the software constructs. Although certain specific software constructs are shown in FIG. 1 and described herein, those skilled in the art will recognize that Memory 122 may further include various other types of software constructs, which are not shown.

In the example of FIG. 1, Memory 122 is shown including a Base Operating System 142. Base Operating System 142 may, for example, include operating system components such as a Linux operating system kernel or the like. Base Operating System 142 may include Scheduling Logic 144, which manages one or more scheduling queues that indicate (or "contain") threads that are runnable on corresponding individual ones of the Processor Cores 124, and that also indicate a currently executing thread for each one of the Processor Core 124. For example, Scheduling Logic 144 may maintain and manage a scheduling queue for each processor core, e.g. Scheduling Queue 146 containing the runnable threads and indicating the currently executing thread for Processor Core 0 126, Scheduling Queue 148 containing the runnable threads and indicating the currently executing thread for Processor Core 1 128, Scheduling Queue 150 containing the runnable threads and indicating the currently executing thread for Processor Core 2 130, Scheduling Queue 152 containing the runnable threads and indicating the currently executing thread for Processor Core 3 132, a Scheduling Queue 154 containing the runnable threads and indicating the currently executing thread for Processor Core 4 134, Scheduling Queue 156 containing the runnable threads and indicating the currently executing thread for Processor Core 5 136, Scheduling. Queue 158 containing the runnable threads and indicating the currently executing thread for Processor Core 6 138, and Scheduling Queue 160 containing the runnable threads and indicating the currently executing thread for Processor Core 7 140. In some embodiments, Scheduling Logic 144 may include or consist of one or more instances of the Completely Fair Scheduler (CFS) provided in some versions of the Linux kernel.

In some embodiments, some or all of the application program code in Memory 122 accesses hardware and/or software resources located in Data Storage System 116 or elsewhere through one or more software containers. As it is generally known, software containerization is a lightweight alternative to full machine virtualization, involving the encapsulation of one or more applications in a container together with their own operating environment. For example, the Docker program developed by Docker, Inc. is an example of software that may be used to provide software containerization. An application executing within a software container can only access the specific resources that are allocated to that container. In some embodiments, software containers may be used to allocate a subset of the processing resources of Storage. Processor 120 (e.g. Set of Processor Cores 124) to specific application logic that executes in Storage Processor 120. In the example of FIG. 1, Block I/O Request Processing Logic 170 is application program code that operates within Block I/O Request Processing Container 162, File I/O Request Processing Logic 186 is application program code that operates within File I/O Request Processing Container 164, and Other Application Logic 191 is application program code that operates within Container 166. The Set of Processor Cores 124 is allocated to each of Block I/O Request Processing Container 162, File I/O Request Processing Container 164, and Container 166. Accordingly, Block I/O Request Processing Logic 170, File I/O Request Processing Logic 186, and Other Application Logic 191 are all able to execute on the processor cores in Set of Processor Cores 124, but not on other processor cores that may be present in Storage Processor 120.

Block I/O Request Processing Logic 170 processes block I/O requests contained in I/O Requests 112, as shown by Block I/O Requests 168. Block I/O Requests 168 are directed to logical disks (e.g. logical units sometimes referred to as LUNs), and/or block-based virtual volumes (VVols), that are hosted by the Data Storage System 116 using Non-Volatile Storage 118. Block I/O Request Processing Logic 170 maps the logical disks and/or virtual volumes hosted by Data Storage System 116 to units of non-volatile data storage contained within the data storage devices in Non-Volatile Storage 118, and uses those units of non-volatile data storage to persistently store host data that it receives from Hosts 110(1-N) in write operations in Block I/O Requests 168.

File I/O Request Processing Logic 186 processes file I/O requests contained in I/O Requests 112, as shown by File I/O Requests 169. File I/O Requests 169 are directed to files in file systems that are hosted by Data Storage. System 116 using Non-Volatile Storage 118. File I/O Request Processing Logic 186 maps the files in file systems hosted by Data Storage System 116 to units of non-volatile data storage contained within the data storage devices in Non-Volatile Storage 118, and uses those units of non-volatile data storage to persistently store host data that it receives from Hosts 110(1-N) in write operations in File I/O Requests 169.

Other Application Logic 191 performs some type of processing other than block I/O request processing or file I/O request processing.

Block I/O Request Processing Logic 170 creates a number of threads that process block I/O requests. The number of threads created by Block I/O Request Processing Logic 170 to process block I/O requests is one less than the total number of processor cores in the Set of Processor Cores 124. In the example of FIG. 1, since there are eight processor cores in the Set of Processor Cores 124, Block I/O Request Processing Logic 170 creates seven threads that process block I/O requests, as shown by Block I/O Request Processing Thread 1 171, Block I/O Request Processing Thread 2 172, Block I/O Request Processing Thread 3 173, Block I/O Request Processing Thread 4 174, Block I/O Request Processing Thread 5 175, Block I/O Request Processing Thread 6 176, and Block I/O Request Processing Thread 7 177. Each one of the block I/O request processing threads operates by processing multiple block I/O requests that are indicated by and/or stored wholly or partly in a corresponding work queue that is also managed by Block I/O Request Processing Logic 171. For example, Block I/O Request Processing Thread 1 171 processes block I/O requests indicated by Work Queue 1 179, Block I/O Request Processing Thread 2 172 processes block I/O requests indicated by Work Queue 2 180, Block I/O Request Processing Thread 3 173 processes block I/O requests indicated by Work Queue 3 181, Block I/O Request Processing Thread 4 174 processes block I/O requests indicated by Work Queue 4 182, Block I/O Request Processing Thread 5 175 processes block I/O requests indicated by Work Queue 5 183, Block I/O Request Processing Thread 6 176 processes block I/O requests indicated by Work Queue 6 184, and Block I/O Request Processing Thread 7 177 processes block I/O requests indicated by Work Queue 7 185. As Block I/O Requests 168 are received by Storage Processor 120, Block I/O Request Processing Logic 170 distributes indications of those block I/O requests among the work queues, e.g. in a manner that provides load balancing among the different block I/O request processing threads.

Each block I/O request processing thread is exclusively assigned by Block I/O Request Processing Logic 170 to an individual processor core. Each block I/O request processing thread can only execute on the processor core to which it is assigned, and the block I/O request processing thread assigned to a processor core is the only block I/O request processing thread that can execute on that processor core. For example, Block I/O Request Processing Thread 1 171 may be assigned to Processor Core 1 128, Block I/O Request Processing Thread 2 172 may be assigned to Processor Core 2 130, Block I/O Request Processing Thread 3 173 may be assigned to Processor Core 3 132, Block I/O Request Processing Thread 4 174 may be assigned to Processor Core 4 134, Block I/O Request Processing Thread 5 175 may be assigned to Processor Core 5 136, Block I/O Request Processing Thread 6 176 may be assigned to Processor Core 6 138, and Block I/O Request Processing Thread 7 177 may be assigned to Processor Core 7 140.

Block I/O Request Processing Logic 170 may also create Monitor Thread 178, which is exclusively assigned to the one remaining processor core in Set of Processor Cores 124 to which no block I/O request processing thread is assigned, e.g. Processor Core 0 126 in FIG. 1. Monitor Thread 178 is the only thread created by Block I/O Request Processing Logic 170 that executes on Processor Core 0 126, and Monitor Thread 178 does not execute on any processor core other than Processor Core 0 126.

File I/O Request Processing Logic 186 creates some number of file I/O request processing threads, shown in the example of FIG. 1 by File I/O Request Processing Thread 1 187, File I/O Request Processing Thread 2 188, File I/O Request Processing Thread 3 189, and so on through File I/O Request Processing Thread N 190. Each file I/O request processing thread processes a single one of the file I/O requests in File I/O Requests 169, and accordingly File I/O Request Processing Logic 186 may create a new file I/O request processing thread for each file I/O request that is received by Storage Processor 120. In some embodiments, each one of the file I/O request processing threads can execute on any one of the processor cores in the Set of Processor Cores 124.

Other Application Logic 191 creates some number of threads that perform processing other than block I/O request or file I/O request processing, shown in the example of FIG. 1 by Thread 1 192, Thread 2 193, and so on through Thread M 194. In some embodiments, each one of the threads created by Other Application Logic 191 can execute on any one of the processor cores in the Set of Processor Cores 124.

Further during operation of the disclosed technology, each block I/O request processing thread executes on the processor core to which it is assigned to process at least one block I/O request in the I/O Requests 112 received by Storage Processor 120, e.g. by processing at least one block I/O request contained in the corresponding work queue. While processing block I/O requests, each block I/O request processing thread measures the time period during which it continuously executes on the processor core to which it is assigned, and compares the measured time period with a block I/O request processing time limit. For example, while it processes one or more block I/O requests indicated by Work Queue 1 170, Block I/O Request Processing Thread 1 172 may measure the period of time during which it continuously executes on Processor Core 1 128, and compare the measured period of time to a block I/O request processing time limit. The block I/O request processing time limit may be a configurable or settable value. The disclosed technology does is not limited to use with any specific value for the block I/O request processing time limit. For example, the block I/O request processing time limit may be set to equal one millisecond, or some other time value that is appropriate for a specific configuration or deployment.

In response to detecting that the time period during which it has continuously executed exceeds the block I/O request processing time limit, each block I/O request processing thread causes the processor core to which it is assigned to execute at least one other thread. In this way, each block I/O request processing thread yields the processor core to which it is assigned after it executes continuously on that processor core for the block I/O processing time limit to one or more other threads that are currently runnable, e.g. that are indicated by the scheduling queue for that processor core. For example, Block I/O Request Processing Thread 1 171 may measure the time period during which it has continuously executed on Processor Core 1 128, and compare the measured time period to the block I/O processing time limit In response to detecting that the time period during which it has continuously executed on Processor Core 1 128 exceeds the block I/O processing time limit, Block I/O Request Processing Thread 1 171 may yield Processor Core 1 128 to at least, one other thread, e.g. by causing at least one other runnable thread that is scheduled for execution on Processor Core 1 128 to execute on Processor Core 1 128. The other thread that is caused to be executed on Processor Core 1 128 may be one or more runnable threads indicated by Scheduling Queue 1 148. For example, Block I/O Request Processing Thread 1 171 may send a request to Scheduling Logic 144 that causes Block I/O Request Processing Thread 1 171 to be moved from the front of Scheduling Queue 1 148 to the back of Scheduling Queue 1 148, thus causing Block I/O Request Processing Thread 171 to temporarily stop execution on Processing Core 1 128, and also causing all other runnable threads contained in Scheduling Queue 1 148 to be executed prior to Block I/O Processing Thread 1 171 being subsequently executed again by Processing Core 1 128.

The other thread or threads that are caused to be executed on a processor core when the block I/O thread processing thread assigned to the processor core has executed longer than the block I/O processing time limit perform other processing that does not include the processing of block I/O requests. Such other processing may include processing of one or more file I/O requests, and/or some other type of processing. For example, the other runnable thread or threads contained in Scheduling Queue 1 148 that are caused to execute on Processor Core 1 128 when Block I/O Request Processing Thread 1 171 has continuously executed on Processor Core 1 128 for longer than the block I/O request processing time limit may include one or more file I/O request processing threads (e.g. one or more of File I/O Request Processing Thread 1 187 through File I/O Request Processing Thread N 190), and/or one or more other application threads (e.g. one or more of Thread 1 192 through Thread M 194). In the case where the runnable threads contained in Scheduling Queue 1 148 that are caused to be executed on Processor Core 1 128 in response to Block I/O Request Processing Thread 1 171 detecting that it has continuously executed on Processor Core 1 128 for longer than the block I/O request time limit include one or more file I/O request processing threads (e.g. one or more of File I/O Request Processing Thread 1 187 through File I/O Request Processing Thread N 190), the file I/O request processing threads executed on Processor Core 1 128 may process one or more corresponding file I/O requests in File I/O Requests 169, and in some cases may complete the processing of those corresponding file I/O requests. For example, if File I/O Request Processing Thread 2 188 is caused to be executed on Processor Core 1 128 in response to Block I/O Request Processing Thread 1 171 detecting that it has continuously executed on Processor Core 1 128 for longer than the block I/O request time limit, execution of File I/O Request Processing Thread 2 188 on Processor Core 1 128 may cause File I/O Request Processing Thread 2 188 to complete processing of an individual file I/O request in File I/O Requests 169 that corresponds to File I/O Request Processing Thread 2 188.

In some embodiments, each block I/O request processing thread may detect when there are no block I/O requests available for it to process, e.g. may detect when there are no block I/O requests remaining to be processed in the corresponding work queue. For example, Block I/O Request Processing Thread 1 171 may detect that there are no block I/O requests available for it to process by detecting that Work Queue 1 179 is empty, or that all block I/O requests indicated by Work Queue 1 179 have been completely processed. In response to detecting that no block I/O requests are available for processing, a block I/O request processing thread may suspend its own execution, e.g. by issuing a command to Scheduling Logic 144 causing the block I/O request processing thread to be removed from the scheduling queue for its assigned processor core. For example, in response to detecting that Work Queue 1 179 is empty, Block I/O Request Processing Thread 1 171 may issue a command to Scheduling Logic 144 that causes Scheduling Logic 144 to suspend execution of Block I/O Request Processing Thread 1 171, e.g. by changing the state of Block I/O Request Processing Thread 1 171 to a suspended state, and/or by removing Block I/O Request Processing Thread 1 171 from Scheduling Queue 1 148. Suspending execution of a block I/O request processing thread prevents that block I/O request processing thread from executing until the block I/O request processing thread is subsequently made runnable again and added back to the scheduling queue. For example, after execution of Block I/O Request Processing Thread 1 171 is suspended, Block I/O Request Processing Thread 1 171 is not executed on Processor Core 1 128 until Block I/O Request Processing Thread 1 171 is subsequently made runnable again to process one or more newly received block I/O requests that are available for processing by Block I/O Request Processing Thread 1 171. For example, Block I/O Request Processing Thread 1 171 may subsequently be made runnable again and added back to Scheduling Queue 1 148 in response to at least one newly received block I/O request being added to Work Queue 1 179 after execution of Block I/O Request Processing Thread 1 171 was suspended, in order for Block I/O Request Processing Thread 1 171 to be executed on Processor Core 1 128 to process the newly received block I/O request.

In some embodiments, the monitor thread executing on Processor Core 0 126 operates to detect when one or more block I/O request processing threads that were previously suspended from execution need to again be made runnable so that they can be executed in order to process one or more newly received block I/O requests that have become available for processing. For example, Monitor Thread 178 may periodically or continuously check the scheduling queue for each processor core in Set of Processing Cores 124 to determine whether the block I/O request processing thread assigned to that processing core has been suspended from execution. In the case where a block I/O request processing thread has been suspended, Monitor Thread 178 may check to see whether the work queue for that block I/O processing thread is non-empty. A non-empty work queue may indicate to Monitor Thread 178 that at least one newly received block I/O request has become available for processing by the suspended block I/O processing thread. In response to detecting that at least one newly received block I/O request is available for processing by a suspended block I/O request processing thread, Monitor Thread 178 makes the suspended block I/O processing thread runnable again so that the block I/O processing thread can be executed and process the newly received block I/O request(s) that are indicated by its work queue. For example, in response to detecting that Block I/O Request Processing Thread 1 171 has been suspended, and that Work Queue 1 179 is non-empty, Monitor Thread 178 may issue a command to Scheduling Logic 144 that causes Block I/O Request Processing Thread 1 171 to be made runnable on Processor Core 1 128. Making Block I/O Request Processing Thread 1 171 runnable on Processor Core 1 128 may result in Block I/O Request Processing Thread 1 171 being added back to Scheduling Queue 1 148. When Block I/O Request Processing Thread 1 171 is subsequently executed on Processor Core 1 128, Block I/O Request Processing Thread 1 171 processes the newly received block I/O requests indicated in Work Queue 1 179.

Each one of the block I/O request processing threads may be assigned a relatively higher priority than is assigned to any of the file I/O request processing threads. For example, a first priority may be assigned to each one of Block I/O Request Processing Thread 1 171 through Block I/O Request Processing Thread 7 177, and a second priority may be assigned to File I/O Request Processing Thread 1 187 through File I/O Request Processing Thread N 190. The second priority may be lower than the first priority, such that execution of any block I/O request processing thread will preempt the execution of any file I/O request processing thread contained in the same scheduling queue. Accordingly, in such embodiments, when Monitor Thread 178 causes a previously suspended block I/O processing thread to be made runnable and added to a scheduling queue, execution of the block I/O processing thread will preempt execution of any file I/O request processing thread also contained in the scheduling queue, even if the file I/O request processing thread is currently executing when the block I/O processing thread is added to the scheduling queue. For example, in the case where Monitor Thread 178 detects that Block I/O Request Processing Thread 1 171 has been suspended, and also that Work Queue 1 179 is non-empty, Monitor Thread 178 may make Block I/O Request Processing Thread 1 171 runnable and add Block I/O Request Processing Thread 1 171 back to Scheduling Queue 1 148. Block I/O Request Processing Thread 1 171 will then be added to Scheduling Queue 1 148 ahead of any file I/O request processing threads that may also be contained in Scheduling Queue 1 148. In the case where a file I/O request processing thread was at the front of Scheduling Queue 1 148 and accordingly executing on Processor Core 1 128 at the time Block I/O Request Processing Thread 1 171 was made runnable and added back to Scheduling Queue 1 148, the higher priority Block I/O Request Processing Thread 1 171 preempts execution of the file I/O request processing thread and Block I/O Request Processing Thread 1 171 and accordingly immediately begins execution on Processor Core 1 128. In some embodiments, the block I/O request processing threads may be assigned a relatively higher priority than the file I/O request processing threads by creating each of the block I/O request processing threads as a real time thread (i.e. an "RT thread").

Figure 2:
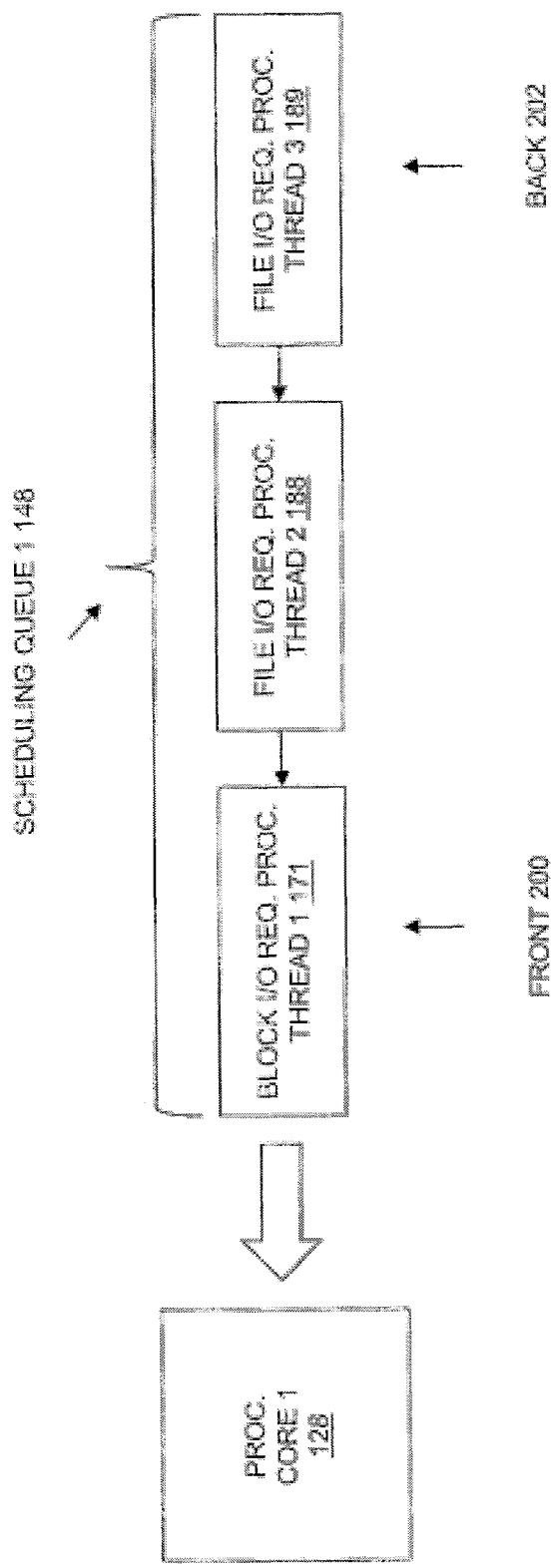
FIG. 2 is a block diagram showing an example of at least a portion of a scheduling queue in some embodiments.
Figure 3:
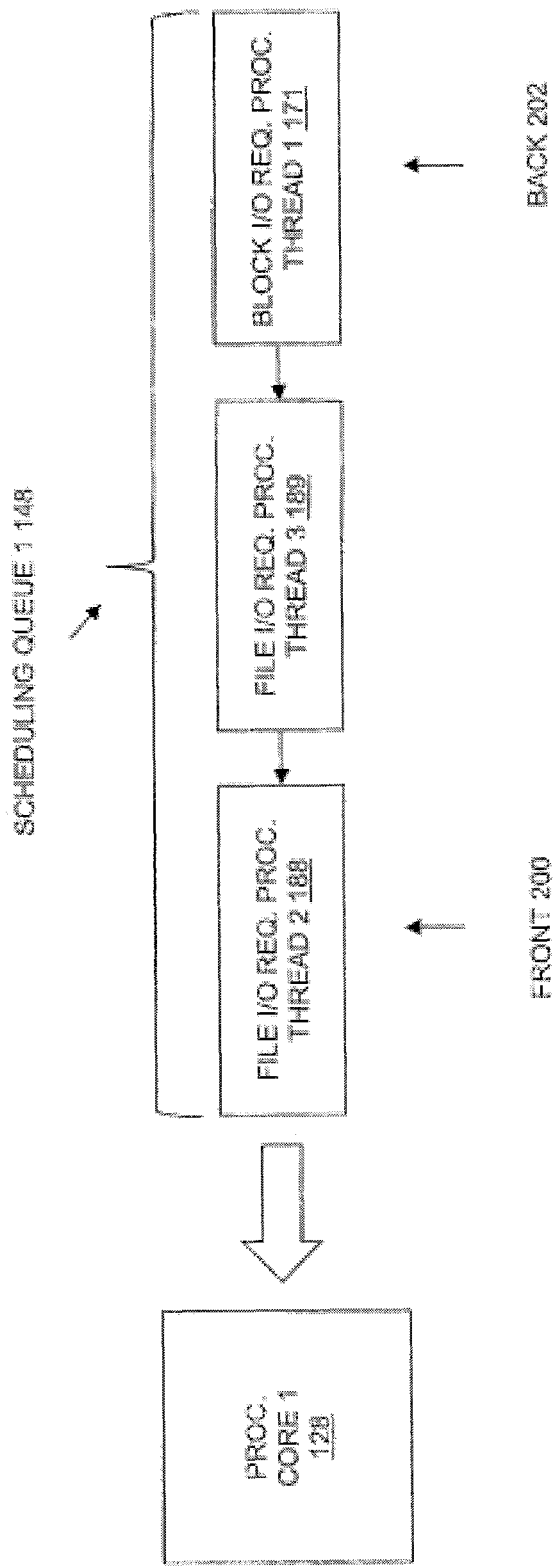
FIG. 3 is a block diagram showing an example of the scheduling queue of FIG. 2 in some embodiments after the disclosed technology has detected that block I/O request processing thread has continuously executed for more than the block I/O request processing time limit.

FIG. 2 is a block diagram showing an example of at least a portion of a scheduling queue in some embodiments. In the example of FIG. 2, Scheduling Queue 1 148 contains Block I/O Request Processing Thread 1 171, File I/O Request Processing Thread 2 188, and File I/O Request Processing Thread 3 189. Block I/O Request Processing Thread 1 171 is located at a front 200 of Scheduling Queue 1 148, and is accordingly executing on Processor Core 1 128. File I/O Request Processing Thread 3 189 is located at a back 202 of Scheduling Queue 1 148. In the case where Block I/O Request Processing Thread 1 171 detects that it has been continuously executing on Processor Core 1 128 for a time period that is equal to or greater than the block I/O request processing limit, Block I/O Request Processing Thread 1 171 yields Processor Core 1 128 to File I/O Request Processing Thread 2 188 and File I/O Request Processing Thread 3 189, such that Block I/O Request Processing Thread 1 171 stops executing on Processor Core 1 128, and File I/O Request Processing Thread 2 188 and File I/O Request Processing Thread 3 189 are allowed to execute on Processor Core 1 128 before Block I/O Request Processing Thread 1 171 again executes on Processor Core 1 128. For example, in response to detecting that it has been continuously executing on Processor Core 1 128 for a time period that is equal to or greater than the block I/O request processing limit, Block I/O Request Processing Thread 1 171 may issue a command to the operating system (e.g. to Scheduling Logic 144) that causes execution of Block I/O Request Processing Thread 1 171 to be stopped, and that causes Block I/O Request Processing Thread 1 171 to be moved to the back 202 of Scheduling Queue 1 148, as shown in FIG. 3.

Figure 4:
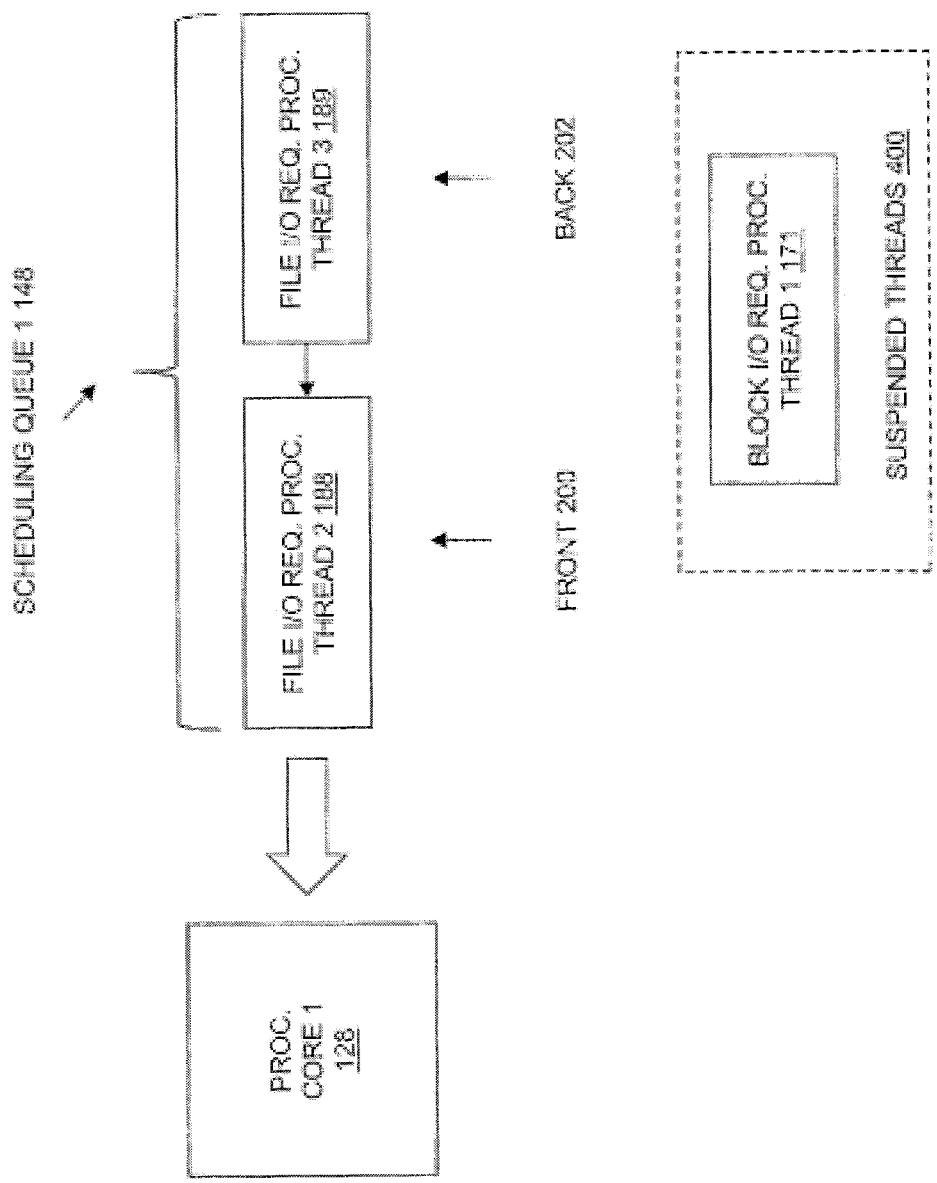
FIG. 4 is a block diagram showing an example of the scheduling queue of FIG. 2 in some embodiments after the disclosed technology has detected that no block I/O requests are available for processing by the block I/O request processing thread.

FIG. 4 is a block diagram showing the scheduling queue shown in FIG. 2 after Block I/O Request Processing Thread 1 171 has detected that no block I/O requests are available for processing by Block I/O Request Processing Thread 1 171, e.g. that Work Queue 1 179 is empty and/or that all block I/O requests indicated by Work Queue 1 179 have been completely processed. For example, in response to detecting that no block I/O requests are available for processing by Block I/O Request Processing Thread 1 171, Block I/O Request Processing Thread 1 171 issued a command to the operating system (e.g. to Scheduling Logic 144) that caused execution of Block I/O Processing Thread 1 171 to be suspended, e.g. that caused Block I/O Processing Thread 1 171 to be removed from Scheduling Queue 1 148 and added to a set of Suspended Threads 400. After Block I/O Processing Thread 1 171 has been removed from Scheduling Queue 1 148, only File I/O Request Processing Thread 2 188 and File I/O Request Processing Thread 3 189 will execute on Processor Core 1 128 until Block I/O Request Processing Thread 1 171 is subsequently made runnable again and/or added back to Scheduling Queue 1 148.

Figure 5:
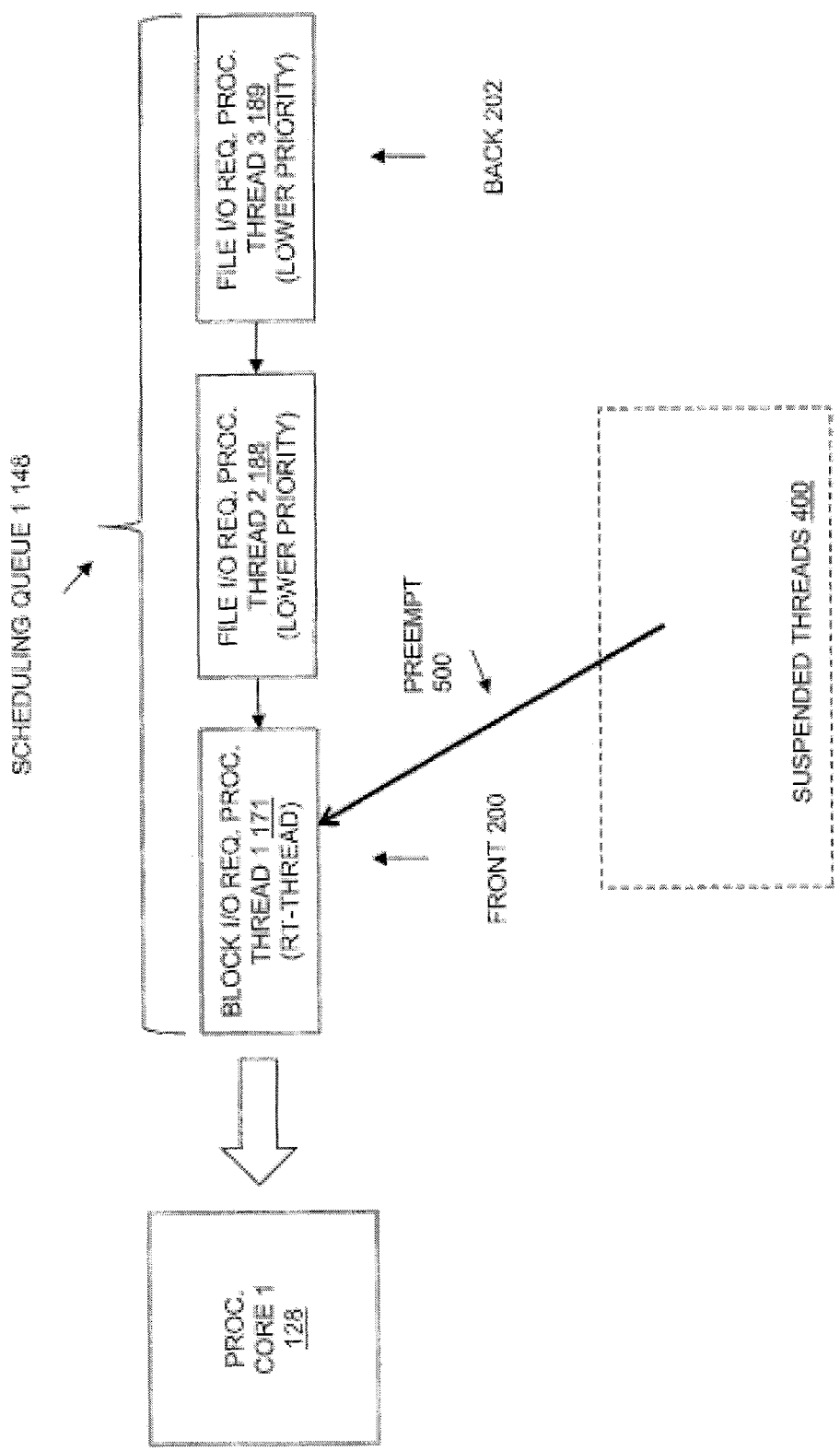
FIG. 5 is a block diagram showing an example of the scheduling queue of FIG. 4 in some embodiments after the disclosed technology detects that a newly received block I/O request is available for processing by the block I/O request processing thread.

FIG. 5 is a block diagram showing the scheduling queue of FIG. 4 after Monitor Thread 178 has detected that a newly received block I/O request is available for processing by Block I/O Request Processing Thread 1 171. For example, in response to detecting that Block I/O Request Processing Thread 1 171 was previously suspended and that Work Queue 1 179 is non-empty, Monitor Thread 178 issued a command to the operating system (e.g. to Scheduling Logic 144) that caused Block I/O Request Processing Thread 1 171 to be made runnable and added back to Scheduling Queue 1 148. As shown at reference number 500, because Block I/O Request Processing Thread 1 171 has been assigned a relatively high priority (e.g. is a real time thread), execution of Block I/O Request Processing Thread 1 171 preempts the execution of File I/O Request Processing Thread 2 188, which was previously executing on Processor Core 1 128, but which has a relatively lower priority. Block I/O Request Processing Thread 1 171 is accordingly added to Scheduling Queue 1 148 at the front 200, and begins executing immediately on Processor Core 1 128, in front of and therefore before both File I/O Request Processing Thread 2 188 and File I/O Request Processing Thread 3 189 are again scheduled for execution.

Figure 6:
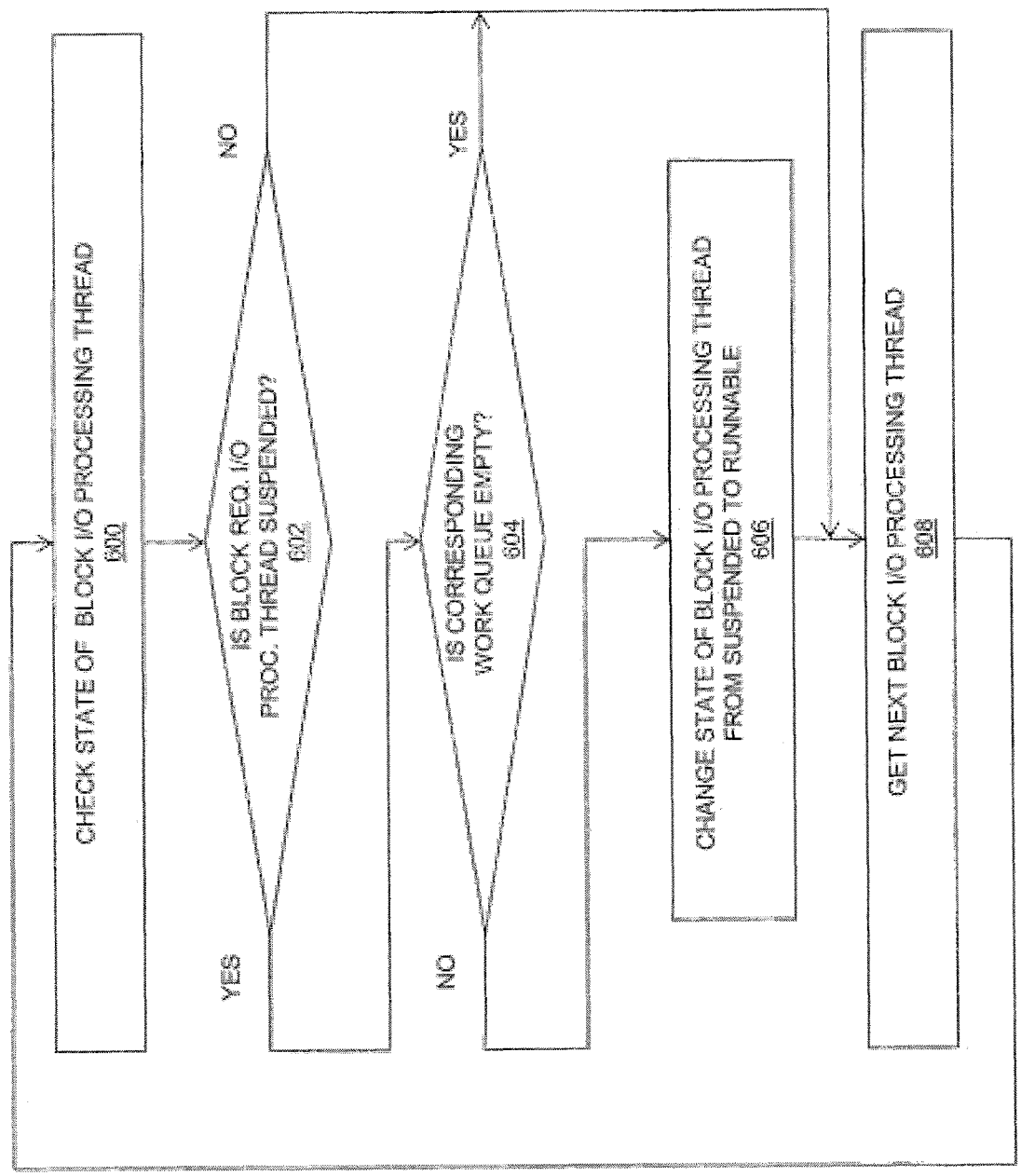
FIG. 6 is a flow chart showing an example of steps performed during operation of some embodiments to monitor block I/O request processing threads that have been suspended and make them runnable again when there are block I/O requests available for processing.

FIG. 6 is a flow chart showing an example of steps performed during operation of some embodiments of Monitor Thread 178 to check those block I/O request processing threads that have previously been suspended, and to make those suspended threads runnable again in response to detecting that there are block I/O requests available for them to process. At step 600, Monitor Thread 178 checks the state of a block I/O processing thread. At step 602, Monitor Thread 178 determines whether the state of the block I/O processing thread is suspended, and the block I/O processing thread is therefore currently not scheduled for execution on the processor core to which it is assigned. If the block I/O processing thread is not suspended, then step 602 is followed by step 608. Otherwise, if the block I/O processing thread is suspended, step 602 is followed by step 604.

At step 604, Monitor Thread 178 determines whether the work queue corresponding to the block I/O request processing thread is empty. If the corresponding work queue is empty, then there are no block I/O requests available for processing by the block I/O request processing thread, and step 604 is followed by step 608. Otherwise, there is at least one newly received block I/O request available for processing by the block I/O request processing thread, and step 604 is followed by step 606.

At step 606, Monitor Thread 178 changes the state of the block I/O request processing thread from suspended to runnable, and/or adds the block I/O request processing thread back to the scheduling queue for the processor core to which the block I/O request processing thread is assigned. The block I/O request processing thread is then run on the processor core to which it is assigned to process the newly received block I/O request. Step 606 is followed by step 608.

At step 608, the Monitor Thread 178 determines a next block I/O request processing thread to check. For example, if the last block I/O request processing thread processed by the steps shown in FIG. 6 was Block I/O Request Processing Thread 1 171, at step 608 Monitor Thread 171 determines that the next block I/O request processing thread to check is Block I/O Request Processing Thread 2 172. Monitor Thread 171 then repeats the steps of FIG. 6 for Block I/O Request Processing Thread 2 172, and then similarly for the remaining block I/O request processing threads in a continuous loop. In this way, Monitor Thread 171 may continuously perform the steps of FIG. 6 across the complete set of block I/O request processing threads, i.e. for each of Block I/O Request Processing Thread 1 171 through Block I/O Request Processing Thread 7 177 in a continuous loop.

Figure 7:
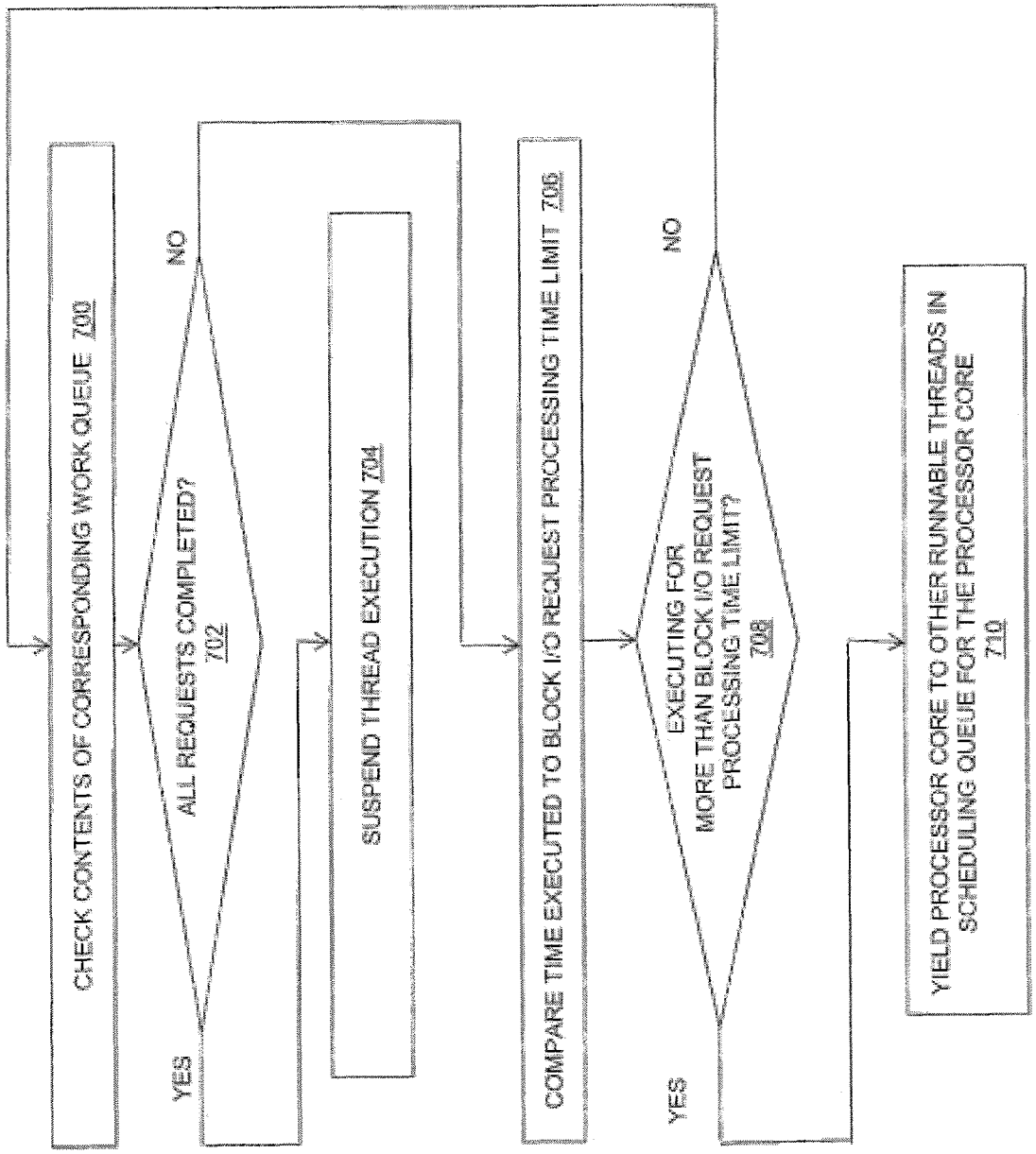
FIG. 7 is a first flow chart showing an example of steps performed during operation of some embodiments to share processor cores in a data storage system.

FIG. 7 is a first flow chart showing an example of steps performed during operation of some embodiments to share processor cores in a data storage system. The steps of FIG. 7 may, for example, be performed by program logic within each block I/O request processing thread. The steps of FIG. 7 may, for example, be performed in response to the block I/O request processing thread beginning execution on the processor core to which it is assigned. At step 700 the block I/O request processing thread checks the contents of its work queue. For example the block I/O request processing thread may check its corresponding work queue at step 700 to determine whether the work queue contains any block I/O requests that have not been completely processed and are therefore available for it to process.

At step 702, the block I/O request processing thread branches based on whether its corresponding work queue contains any block I/O requests that have not been completely processed. For example, if the corresponding work queue for the block I/O request processing thread is not empty, and therefore contains at least one block I/O requests that have not been completely processed, step 702 is followed by step 706. Otherwise, if the corresponding work queue for the block I/O request processing thread is empty, and contains no block I/O requests that have not been completely processed, step 702 is followed by step 704. At step 704, the block I/O request processing thread suspends its execution on the processor core to which it is assigned (e.g. is removed from the scheduling queue for the processor core to which it is assigned), such that it will not be executed again until it is subsequently made runnable again (e.g. is added back to the scheduling queue for the processor core to which is assigned). Step 704 is followed by step 706.

At step 706, the block I/O request processing thread compares a time that it has continuously executed on the processor core to which it is assigned to a block I/O request processing time limit. Step 706 is followed by step 708, in which the block I/O request processing thread branches based on whether the block I/O request processing thread has been executing for a time period that exceeds the block I/O request processing time limit. In the case where the block I/O request processing thread has not continuously executed for a time period that is greater than the block I/O request processing time limit, step 708 is followed by step 700, and the steps of FIG. 7 are repeated. Alternatively, in the case where the block I/O request processing thread has continuously executed for a time period that is greater than the block I/O request processing time limit, step 708 is followed by step 710. In step 710, the block I/O request processing thread yields its assigned processor core to at least one other runnable thread indicated by the scheduling queue for the processor core to which it is assigned.

FIG. 8 is a second flow chart showing an example of steps performed during operation of some embodiments to share processor cores in a data storage system. At step 800, an individual block I/O request processing thread is assigned to a single processor core within a set of processor cores in a data storage system. The block I/O request processing thread is operable, when executed, to process block I/O requests that are received by the data storage system from at least one host computer. The block I/O request processing thread is the only block I/O request processing thread that can be executed on the processor core to which it is assigned, and the block I/O request processing thread can only be executed on the processor core to which it is assigned.

At step 802, the block I/O request processing thread is executed on the processor core to which it is assigned, in order to process at least one block i/o request received by the data storage system from the host computer.

At step 804, the block I/O request processing thread measures a time period during which the block I/O request processing thread has continuously executed on the processor core to which it is assigned.

At step 806, the block I/O request processing thread compares the time period during which the block I/O request processing thread has continuously executed on the processor core to which it is assigned to a block I/O request processing time limit.

At step 808, in response to detecting that the time period during which the block I/O request processing thread has continuously executed on the processor core to which it assigned exceeds the block I/O request processing time limit, the block I/O request processing thread causes the processor core to which the block I/O request processing thread is assigned to execute at least one other thread, where the other thread that is caused to be executed does not process block I/O requests.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art will readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of sharing a set of processor cores in a data storage system, comprising:
assigning an individual block I/O request processing thread to a single processor core within the set of processor cores in the data storage system, wherein the block I/O request processing thread is operable, when executed, to process block I/O requests received by the data storage system from at least one host computer, wherein the block I/O request processing thread is the only block I/O request processing thread that can be executed on the processor core to which it is assigned, and wherein the block I/O request processing thread can only be executed on the processor core to which it is assigned;
executing the block I/O request processing thread on the processor core to which it is assigned to process at least one block I/O request received by the data storage system from the host computer;
measuring a time period during which the block I/O request processing thread has continuously executed on the processor core to which it is assigned;
comparing the time period during which the block I/O request processing thread has continuously executed on the processor core to which it is assigned to a block I/O request processing time limit; and
in response to detecting that the time period during which the block I/O request processing thread has executed exceeds the block I/O request processing time limit, causing the processor core to which the block I/O request processing thread is assigned to execute at least one other thread, wherein the other thread performs processing that does not include processing block I/O requests.

2. The method of claim 1, wherein the other thread that is caused to execute on the corresponding processor core to which the block I/O request processing thread is assigned comprises at least one file I/O request processing thread that is currently runnable, wherein the file I/O request processing thread is operable, when executed, to process a single file I/O request corresponding to the file I/O request processing thread; and
wherein executing the file I/O request processing thread on the processor core to which the block I/O request processing request is assigned causes the file I/O request processing thread to complete processing of the single file I/O request corresponding to the file I/O request processing thread.

3. The method of claim 1, further comprising
detecting that no block I/O requests are available for processing by the block I/O request processing thread;
in response to detecting that no block I/O requests are available for processing by the block I/O request processing thread, suspending execution of the block I/O request processing thread; and
wherein suspending execution of the block I/O request processing thread prevents the block I/O request processing thread from executing on the processor core to which the block I/O request processing thread is assigned until the block I/O request processing thread is subsequently made runnable.

4. The method of claim 3, further comprising
subsequent to suspending execution of the block I/O request processing thread, detecting that a newly received block I/O request is available for processing by the block I/O request processing thread;
in response to detecting that a newly received block I/O request is available for processing by the block I/O request processing thread, making the block I/O request processing thread runnable; and
wherein making the block I/O request processing thread runnable causes the block I/O request processing thread to execute on the processor core to which the block I/O request processing thread is assigned to process the newly received block I/O request.

5. The method of claim 4, further comprising
assigning a monitor thread to a second processor core within the set of processor cores in the data storage system, wherein the second processor core within the set of processor cores is different from the processor core to which the I/O request processing thread is assigned, wherein the monitor thread can only execute on the second processor core and is the only thread that executes on the second processor core, and wherein the monitor thread is operable, when executed, subsequent to the execution of the block I/O request processing thread being suspended, to i) detect that the newly received block I/O request is available for processing by the block I/O request processing thread, and ii) in response to detecting that the newly received block I/O request is available for processing by the block I/O request processing thread, make the block I/O request processing thread runnable.

6. The method of claim 5, further comprising
assigning a first priority to the block I/O request processing thread;
assigning a second priority to each file I/O request processing thread, wherein the second priority is lower than the first priority; and
wherein making the block I/O request processing thread runnable after execution of the block I/O request processing thread was suspended causes the block I/O request processing thread to preempt execution of at least one runnable file I/O request processing thread and to immediately begin execution on the processor core to which it is assigned in response to the first priority assigned to the block I/O processing thread and the second priority assigned to each file I/O request processing thread.

7. A storage processor in a data storage system, the storage processor including a set of processor cores and memory coupled to the set of processor cores, the memory storing instructions, wherein the instructions, when executed by the set of processor cores, cause the processor cores to:
assign an individual block I/O request processing thread to a single processor core within the set of processor cores, wherein the block I/O request processing thread is operable, when executed, to process block I/O requests received by the data storage system from at least one host computer, wherein the block I/O request processing thread is the only block I/O request processing thread that can be executed on the processor core to which it is assigned, and wherein the block I/O request processing thread can only be executed on the processor core to which it is assigned;

execute the block I/O request processing thread on the processor core to which it is assigned to process at least one block I/O request received by the data storage system from the host computer;

measure a time period during which the block I/O request processing thread has continuously executed on the processor core to which it is assigned;

compare the time period during which the block I/O request processing thread has continuously executed on the processor core to which it is assigned to a block I/O request processing time limit; and in response to detecting that the time period during which the block I/O request processing thread has executed exceeds the block I/O request processing time limit, cause the processor core to which the block I/O request processing thread is assigned to execute at least one other thread, wherein the other thread performs processing that does not include processing block I/O requests.

8. The storage processor of claim 7, wherein the other thread that is caused to execute on the corresponding processor core to which the block I/O request processing thread is assigned comprises at least one file I/O request processing thread that is currently runnable, wherein the file I/O request processing thread is operable, when executed, to process a single file I/O request corresponding to the file I/O request processing thread; and wherein execution of the file I/O request processing thread on the processor core to which the block I/O request processing request is assigned causes the file I/O request processing thread to complete processing of the single file I/O request corresponding to the file I/O request processing thread.

9. The storage processor of claim 7, wherein the instructions, when executed by the set of processor cores, further cause the processor cores to:

detect that no block I/O requests are available for processing by the block I/O request processing thread; and in response to detecting that no block I/O requests are available for processing by the block I/O request processing thread, suspend execution of the block I/O request processing thread;

wherein suspending execution of the block I/O request processing thread prevents the block I/O request processing thread from executing on the processor core to which the block I/O request processing thread is assigned until the block I/O request processing thread is subsequently made runnable.

10. The storage processor of claim 9, wherein the instructions, when executed by the set of processor cores, further cause the processor cores to:

subsequent to execution of the block I/O request processing thread being suspended, detect that a newly received block I/O request is available for processing by the block I/O request processing thread; and in response to detecting that a newly received block I/O request is available for processing by the block I/O request processing thread, make the block I/O request processing thread runnable;

wherein making the block I/O request processing thread runnable causes the block I/O request processing thread to execute on the processor core to which the block I/O request processing thread is assigned to process the newly received block I/O request.

11. The storage processor of claim 10, wherein the instructions, when executed by the set of processor cores, further cause the processor cores to:

assign a monitor thread to a second processor core within the set of processor cores in the data storage system, wherein the second processor core within the set of processor cores is different from the processor core to which the I/O request processing thread is assigned, wherein the monitor thread can only execute on the second processor core and is the only thread that executes on the second processor core, and wherein the monitor thread is operable, when executed, subsequent to the execution of the block I/O request processing thread being suspended, to i) detect that the newly received block I/O request is available for processing by the block I/O request processing thread, and ii) in response to detecting that the newly received block I/O request is available for processing by the block I/O request processing thread, make the block I/O request processing thread runnable.

12. The storage processor of claim 11, wherein the instructions, when executed by the set of processor cores, further cause the processor cores to:

assign a first priority to the block I/O request processing thread; and assign a second priority to each file I/O request processing thread, wherein the second priority is lower than the first priority;

wherein making the block I/O request processing thread runnable after execution of the block I/O request processing thread was suspended causes the block I/O request processing thread to preempt execution of at least one runnable file I/O request processing thread and to immediately begin execution on the processor core to which it is assigned in response to the first priority assigned to the block I/O processing thread and the second priority assigned to each file I/O request processing thread.

13. A non-transitory, computer-readable medium including instructions which, when executed by a set of processor cores of in a storage processor in a data storage system, cause the set of processor cores to perform a method comprising the steps of:

assigning an individual block I/O request processing thread to a single processor core within the set of processor cores in the data storage system, wherein the block I/O request processing thread is operable, when executed, to process block I/O requests received by the data storage system from at least one host computer, wherein the block I/O request processing thread is the only block I/O request processing thread that can be executed on the processor core to which it is assigned, and wherein the block I/O request processing thread can only be executed on the processor core to which it is assigned;

executing the block I/O request processing thread on the processor core to which it is assigned to process at least one block I/O request received by the data storage system from the host computer;

measuring a time period during which the block I/O request processing thread has continuously executed on the processor core to which it is assigned;

comparing the time period during which the block I/O request processing thread has continuously executed on the processor core to which it is assigned to a block I/O request processing time limit; and in response to detecting that the time period during which the block I/O request processing thread has executed exceeds the block I/O request processing time limit, causing the processor core to which the block I/O request processing thread is assigned to execute at least one other thread, wherein the other thread performs processing that does not include processing block I/O requests.

* * * * *